United States Patent
Dalal et al.

(10) Patent No.: US 9,141,603 B2
(45) Date of Patent: *Sep. 22, 2015

(54) COMPUTER PROGRAM PRODUCT AND COMPUTER SYSTEM FOR LANGUAGE-ENHANCED PROGRAMMING TOOLS

(71) Applicant: International Business Machines Corporation, Armonk, NY (US)

(72) Inventors: Baiju Dalal, Maharashtra State (IN); Mohit Kalra, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 349 days.

This patent is subject to a terminal disclaimer.

(21) Appl. No.: 13/655,671

(22) Filed: Oct. 19, 2012

(65) Prior Publication Data

US 2013/0041651 A1 Feb. 14, 2013

Related U.S. Application Data

(63) Continuation of application No. 12/475,471, filed on May 30, 2009, now Pat. No. 8,359,189.

(51) Int. Cl.
*G06F 17/28* (2006.01)
*G06F 17/27* (2006.01)
(52) U.S. Cl.
CPC .............. *G06F 17/277* (2013.01); *G06F 17/28* (2013.01)
(58) Field of Classification Search
CPC . G06F 17/28; G06F 17/2809; G06F 17/2836; G06F 17/2854; G06F 17/2863; G06F 17/2872; G06F 17/289; G10L 15/00; G10L 15/005; G10L 15/18; G10L 15/22; G10L 15/26
USPC .................................. 704/3, 2, 5, 9, 260, 277
See application file for complete search history.

(56) References Cited

U.S. PATENT DOCUMENTS

| | | | |
|---|---|---|---|
| 5,768,603 A | 6/1998 | Brown | |
| 6,411,932 B1 | 6/2002 | Molnar | |
| 6,529,865 B1 | 3/2003 | Duan | |
| 6,778,949 B2 | 8/2004 | Duan | |
| 7,412,388 B2 | 8/2008 | Dalal | |
| 7,536,294 B1 | 5/2009 | Stanz | |
| 7,966,170 B2 | 6/2011 | Dalal | |
| 2003/0009338 A1 | 1/2003 | Kochanski | |

(Continued)

OTHER PUBLICATIONS

7412388B2 Nonfinal Rejection Jan. 25, 2008.

(Continued)

*Primary Examiner* — Qi Han
(74) *Attorney, Agent, or Firm* — Anthony V. S. England

(57) ABSTRACT

Statements of a computer program expressed using a first source natural language are made meaningful to a programmer familiar with a second target natural language. The first source natural language of the computer program is determined from the programmer, or through analysis, and the second target natural language desired by the programmer is selected. Textual constructs may be parsed, with reference to stored coding conventions to determine meaningful lexical tokens. Such tokens are translated with a translation engine, and displayed to the programmer, desirably using a graphical user interface feature of an integrated development, environment (IDE) for computer programming in a particular programming language.

14 Claims, 11 Drawing Sheets

(56) References Cited

U.S. PATENT DOCUMENTS

| | | |
|---|---|---|
| 2003/0200535 A1 | 10/2003 | McNamara |
| 2005/0131672 A1 | 6/2005 | Dalal |
| 2008/0294422 A1 | 11/2008 | Dalal |
| 2008/0307400 A1 | 12/2008 | Dalal |
| 2009/0240485 A1 | 9/2009 | Dalal |
| 2010/0145674 A1 | 6/2010 | Dalal |

OTHER PUBLICATIONS

7412388B2 Response to Nonfinal Rejection Apr. 25, 2008.
7412388B2 Notice of Allowance Jun. 2, 2008.
20080307400 Nonfinal Rejection Aug. 9, 2010.
20080307400 Letter Express Abandonment Sep. 5, 2010.
20080307400 Notice of Abandonment Sep. 8, 2010.
20080294422 Preliminary Amendment Oct. 7, 2008.
20080294422 Letter Express Abandonment Sep. 5, 2010.
20080294422 Notice of Abandonment Sep. 8, 2010.
7966170 Nonfinal Rejection Aug. 6, 2010.
7966170 Response Nonfinal Rejection and Terminal Disclaimer Nov. 8, 2010.
7966170 Notice of Allowance Feb. 17, 2011.
20100145674 RequirementFor Restriction Feb. 18, 2012.
20100145674 Response to Requirement for Restriction Mar. 16, 2011.
20100145674 Nonfinal Rejection Apr. 26, 2011.
20100145674 Response to Nonfinal Rejection Aug. 26, 2011.
20100145674 Final Rejection Oct. 25, 2011.
20100145674 Response to Final OA Jan. 18, 2012.
20100145674 Notice of Allowance Jun. 7, 2012.
20100145674 RCE & IDS Aug. 15, 2012.
20100145674 Notice of Allowance Sep. 17, 2012.
Practical Algorithms for Incremental Software Development Environments, Tim A. Wagner, Mar. 10, 1998.

COMPUTER PROGRAM PRODUCT AND COMPUTER SYSTEM FOR LANGUAGE-ENHANCED PROGRAMMING TOOLS

CROSS-REFERENCE TO RELATED APPLICATIONS

This application is a continuation of prior application Ser. No. 12/475,471, filed on May 30, 2009, which was a continuation of application Ser. No. 12/180,541, filed on Jul. 27, 2008, which was a continuation of patent application Ser. No. 10/734,794, filed on Dec. 12, 2003 (now U.S. Pat. No. 7,412,388, issued Aug. 12, 2008), and this application claims the benefit of those earlier filing dates.

FIELD OF THE INVENTION

The present invention relates to computer-based programming tools.

BACKGROUND

A computer programming language has a predefined syntax that allows programmers to express logical statements of in a universal manner. In any computer program, there is an intimate link between the universal and predetermined nature of a computer language in which the logical statements of the computer program are encoded, and the arbitrary semantic constructs from a particular human language, such as English, French, German etc., in which those statements are expressed. For example comments, and the names of variables and functions, are often derived from the programmer's first natural language, or "native tongue".

Thus, while a computer program may rely upon a universally understood grammar, the semantic content of that computer program may in many cases be difficult to comprehend for programmers who do not share the author's natural language.

As an example, consider a team of German programmers which has produced a large software project. The computer code is commented using commentary in the German language, with which all of the German programmers are familiar. Accordingly, each of the German programmers can readily understand each other's work and can contribute to their peers' work as informed observers. The software project is deployed in many countries and in, for example, Canada, a major rewrite of the project is required to comply with local regulations.

As the Canadian programmers understand one or both of English and French, but rarely German, the Canadian programmers are at a distinct disadvantage. While the grammar of the language is entirely familiar, and the meaning of the code can be deduced from logical statements and their structural context, the semantic context upon which a full understanding so heavily relies is largely indecipherable to the Canadian programmers.

With the advent of reliable global data communications, computer software projects are simultaneously conducted in various geographical locations using programmers that have different competencies in different natural languages. Similarly, computer code originating in one country is commonly deployed in many other countries, as in the hypothetical example given above.

Accordingly, in view of the above observations, a need clearly exists for an improved manner of allowing the semantic content of computer programs to be accessible to those who do not understand the natural language from which this semantic content derives.

SUMMARY

Techniques are described herein for making statements of a computer program in a first source natural language, so that semantic content of the computer program is meaningful to a programmer familiar with a second target natural language. These techniques involve first determining the first source natural language of the computer program, either through analysis or user settings, and the second target natural language selected by the programmer.

Once the source and target languages are established, textual constructs in the source natural language of the computer program are determined for translation into the desired target natural language. Subtokenization is performed to form, as required, lexical tokens from the textual constructs. Subtokenization may rely on likely or detected coding conventions. The necessary translation is performed, using a translation engine having a standard application programming interface (API). The translation results are displayed, in any convenient form, for the benefit of the programmer. For example, a mouse pointer may be used to indicate a particular textual construct, such as a function name, and a translation is provided in a pop-up window in the graphical user interface.

In most cases, identified textual constructs are further broken into individual lexical tokens prior to translation. These tokens are usually parts of particular textual constructs identified in any appropriate manner. One approach is to rely upon a repository of coding style conventions that encapsulate a coding style for naming functions, variable etc. Using such coding conventions, individual tokens that can be translated by the translation engine can be identified.

The techniques described herein are advantageously incorporated into an integrated development environment (IDE) with which programmers are familiar. Additional translation features, as described herein, can then be provided for use by the programmer.

DETAILED DESCRIPTION

A detailed description is provided of the facilities that are added to programming development tools to allow programmers that use different natural languages to have the freedom of expressing their thoughts and understanding each other's thoughts without restricting the natural language that is used in the computer programming language.

Translation Engines for Natural Text

Figure 1:
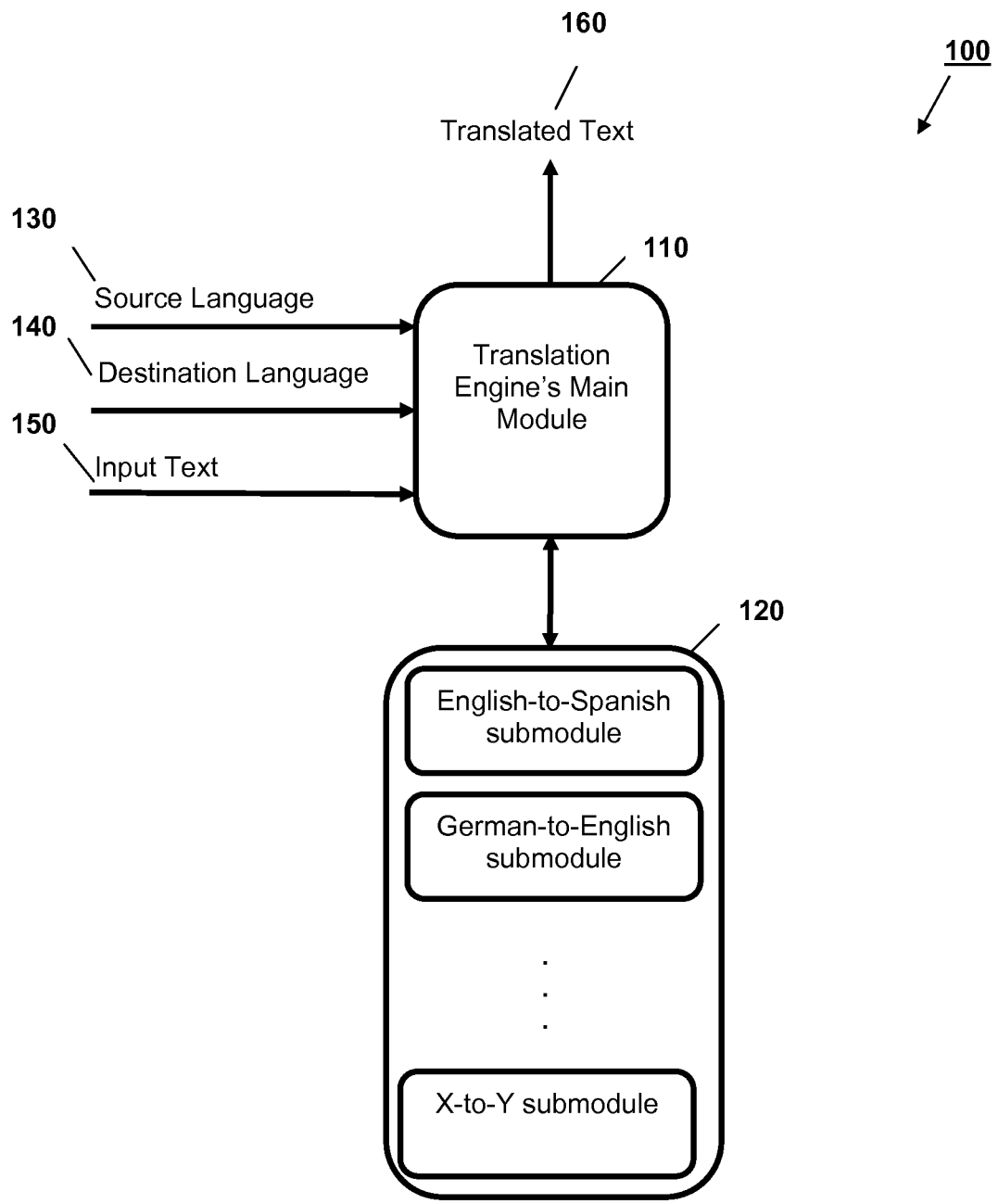
FIG. 1 is a schematic representation of a translation engine.

Translation is the act of converting words and sentences expressed in one natural language into another natural language. FIG. 1 schematically represents the architecture of a translation engine 100 and its operation.

The inputs to the translation engine 100 are:

the natural language of the text that needs to be translated, namely the source language 130.

the natural language into which the text is to be translated, namely the destination language 140.

the sentences, phrases or other text that need to be translated from one natural language to the other natural language, referred to as the input text 150.

The translation engine 100 may in same cases have embedded intelligence to detect the natural language of the source text, in which case the input for the natural language of the text is not required.

The output of the translation engine 100 is the translated text in the desired natural language, that is the translated text 160. An example of a translation engine 100 is described below.

The translation engine's main module 110 acts as a consistent and standard interface for users. The inputs 130, 140, 150 and output 160 of the translation engine 100 are as described above. The main module 110 delegates the task of translating text to the relevant submodules 120. The choice of the submodules depends on the inputs of the user. Such an arrangement can be provided for use in the form of binaries (Dynamic Link Libraries, executables, etc), or in the form of Web services, so that other software can make use of this facility in their code.

Figure 2:
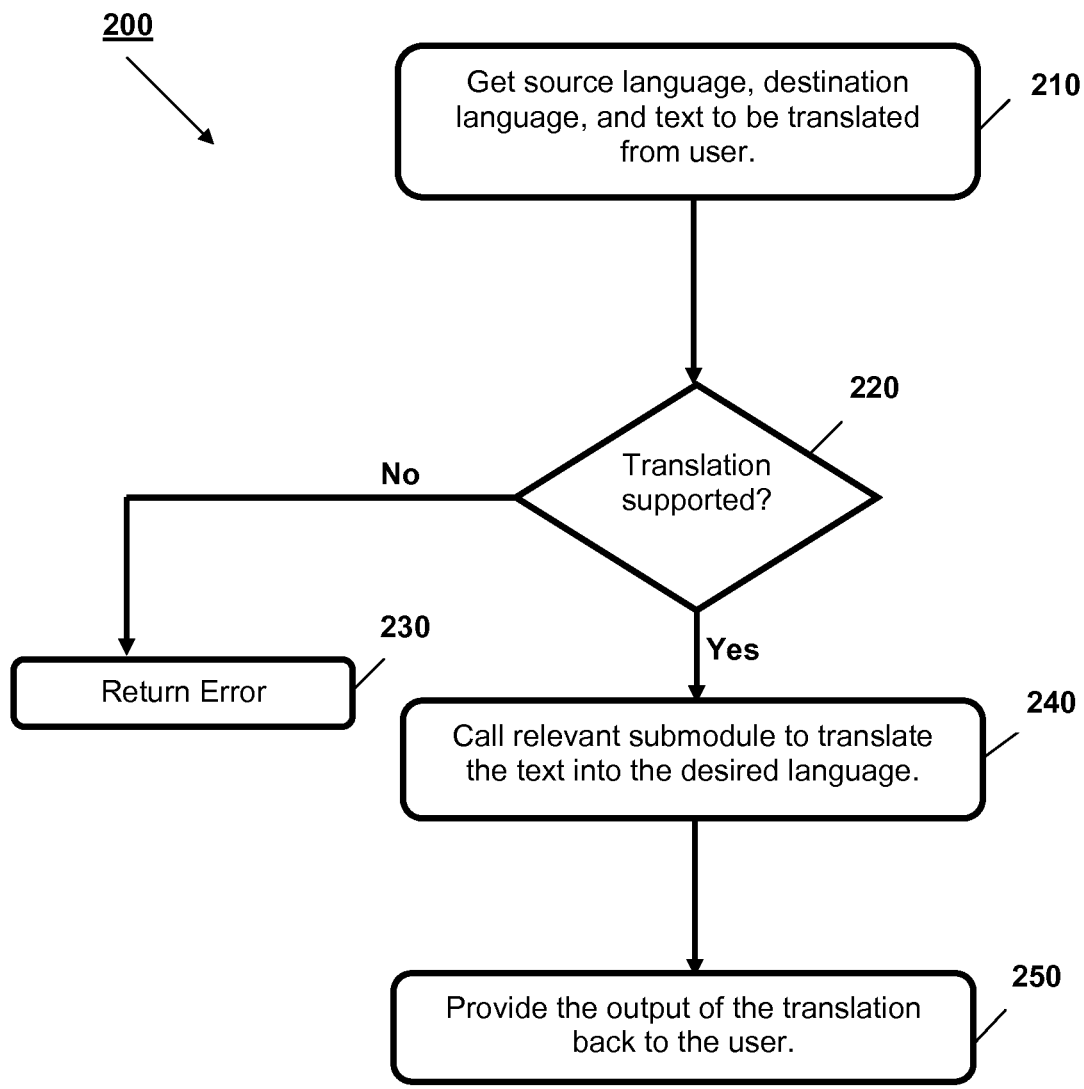
FIG. 2 is a flow chart that represents steps involved in the operation of the translation engine of FIG. 1.

FIG. 2 is a flow chart 200 that describes the steps of how a translation engine 100 operates. These steps of FIG. 2 are tabulated in Table 1 below using correspondingly numbered steps.

TABLE 1

| Step 210 | Get the source language s, destination language d and the input text t from the user. |
| Step 220 | If translation from natural language s to natural language d is supported then perform step 240, or else perform step 230. |
| Step 230 | Return an error to the user. |
| Step 240 | Call the relevant submodule(s) to translate the input text t in the source natural language s into the destination natural language d. |
| Step 250 | Provide the output of the current translation back to the user. |

Translation Engines for Code Editors and Displayers

Code editors differ from code displayers. Code editors such as the "vi editor" used in Unix and related computer operating systems allow the programmer to alter the code. Code displayers are seen in debuggers (such as gdb, also used in the Unix environment), which provide a facility for displaying the code only. Source code in a viewer is read-only and in an editor, the source code is read-write. In gdb, this is done through the "list" command. The term "editor" is used herein for editors and displayers interchangeably.

Source code in its most basic form is a stream of characters. To generate a binary executable from the source code, the compiler requires the source code to pass through various stages. Various tools (for example, editors) also apply similar steps to identify various tokens of a computer program. One use of tokenizing a program is to display various tokens in different colors. This process is referred to as "syntax highlighting".

Breaking a character stream into tokens is performed by lexically analyzing the source code. Lexical analysis is also termed "scanning", and the modules that perform this task of tokenizing a program are known as lexical analyzers (or, less formally scanners). For example, lexical analysis helps the editor determine comments in source code. Lexical analyzers are coded by programmers or, as in many cases, tools (such as lex) are used to generate these programs. Tokens are the output of a lexical analyzer. A lexeme is the stream of characters that form a token. For example, a C style comment "/* function to do this and that */" will be identified as a token TOKEN_COMMENT, and the lexeme is the comment string itself.

Re-tokenizing a computer program completely is expensive in terms of the computer processing time. Editors cannot afford to do this when the user is constantly editing the source code. A technique called "incremental lexical analysis" is used to re-tokenize the altered portion of the source code and code in the vicinity of this altered portion. This technique localizes the re-tokenizing process around the altered text during an editing session. Tim A. Wagner describes a suitable algorithm in further detail in *Practical Algorithms for Incremental Software Development*, published Mar. 10, 1998, in Chapter 5, entitled "General Incremental Lexical Analysis". This reference describes in detail how editors can implement incremental lexical analysis to avoid re-tokenizing the whole program when the user is continuously editing the program. This publication has the details of the most commonly used generic incremental lexical algorithm.

Identifying statements, expressions and declarations based on the grammar of a programming language is achieved by parsing the tokens obtained from lexical analysis. Tools such as Yacc can assist in generating programs that can parse a stream of tokens using a set of rules set by the grammar. For example, parsing identifies a declaration of a variable. Lexical analysis and parsing helps in identifying various constructs of a computer program.

Editors implement lexical analysis in submodules or delegate the task of tokenizing/parsing to other tools. For example, a tool called "Ctags" can scan a source tree and identify the function names, variables in a source file. This information is used by various editors that do not have a strong lexical engine built into the editors. An integrated development environment (IDE) has at least editor, a compiler, and a debugger. Editors can reuse the output of various tools. For example, editors may reuse the lexically analyzed output of the compilers. Different arrangements exist but, more importantly, editors can be made capable of lexically analyzing and parsing code to determine various tokens and language constructs.

Editors

Editors interface with translation engines and display the translatable code in the native language selected by the programmer. The kind of tokens to be translated can be configured by a user.

Translatable code usually consists of comments, variable names, function names, and so on. For example, editors provide the facility of translating the comments that are originally expressed in, for example, the German language into comments expressed in, for example, the English language.

Depending on inputs provided by a user, the editor may want to translate:

1. A lexeme (a stream of characters that are a token) such as a comment.

2. A construct of the language such as a variable declaration or function name.

The following description uses the term construct for one such translatable code item. The procedure of how lexical analysis and parsing facilitates their extraction from the source code is described above. Editors can implement (or already implement) the procedure for both techniques using standard lexical analysis and parsing algorithms.

Figure 3:
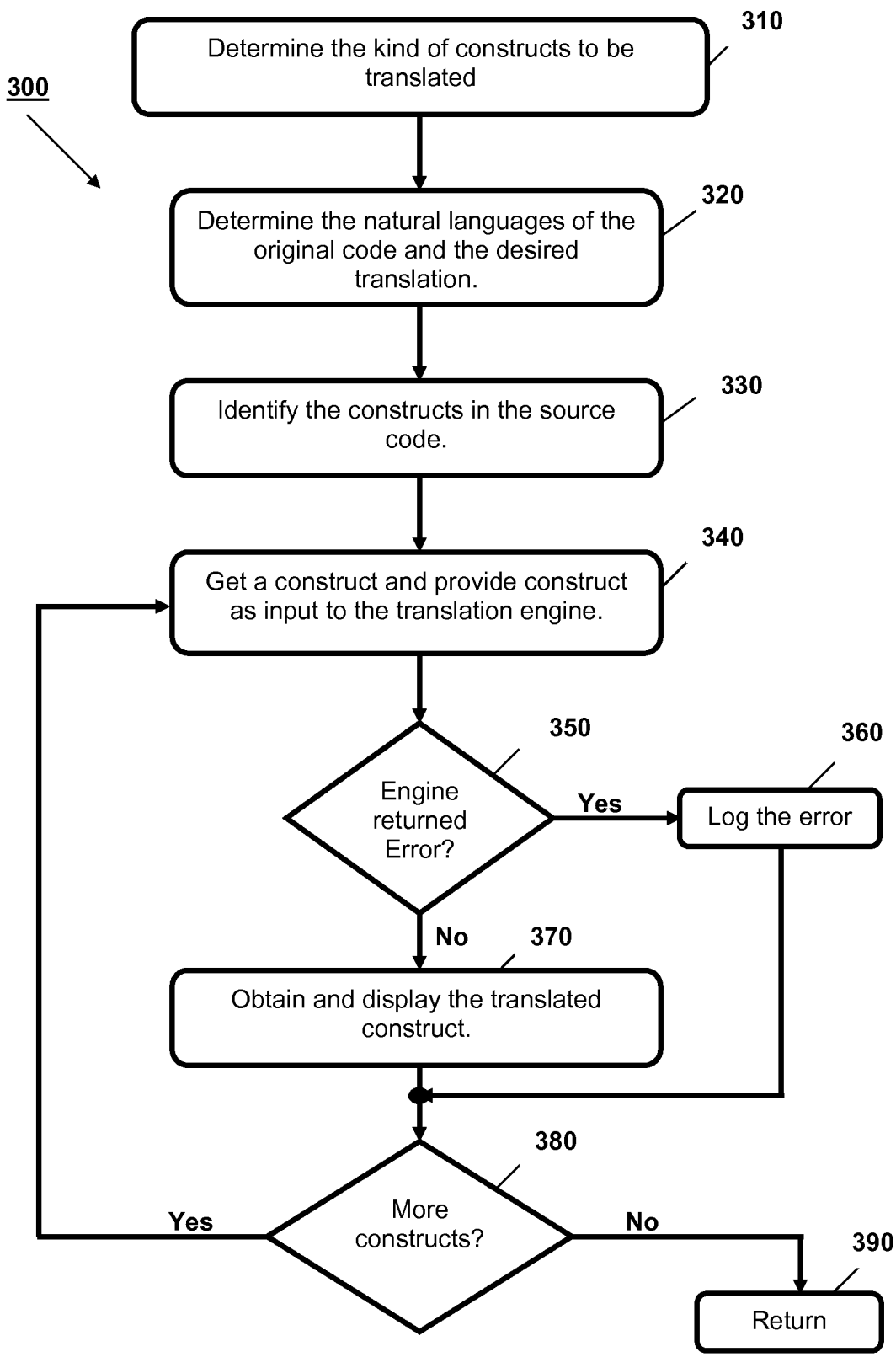
FIG. 3 is a flow chart that represents steps required to perform the code's natural language translation.

FIG. 3 is a flow chart that represents steps required to perform the code's natural language translation. These steps represented in FIG. 3 are tabulated in Table 2 below using correspondingly numbered steps.

TABLE 2

| | |
|---|---|
| Step 310 | The editor gathers the kind of constructs that need to be translated as input from the user. Optionally, this information is obtained from user settings (or from default settings if none are present). |
| Step 320 | The editor gathers the source and destination natural languages for the translation process as input from the user. |
| Step 330 | The editor identifies the constructs in the program being edited. This is done with the help of lexical analysis and parsing which is either inbuilt in the editor or facilitated by external tools. |
| Step 340 | The editor gets a construct to be translated and feeds the construct as input to the translation engine. |
| Step 350 | If the translation engine returned an error then perform steps 360 else perform step 370. |
| Step 360 | Log the translation engine error. Proceed to step 380. |
| Step 370 | The editor obtains the output (translated constructs) from the translation engine. The editor then displays the translated constructs in a comprehensible manner. A few sample techniques are as follows: 1. Layer the translated code on top of the original code and display the translated code. 2. Insert the translated code as comments in the original code. 3. Display the translation as a tool tip when the mouse hovers over a construct that needed translation. 4. Display the translation in a separate window along with the original code in another window. 5. Display the translation in any other convenient manner. |
| Step 380 | If there are more constructs to be translated then perform step 340, else perform step 390. |
| Step 390 | Return to the calling function. |

A hypothetical example is where a user instructs the editor that comments and function names should be translated from German to English. The editor, upon processing the code as described according the steps above, displays the comments and function names in English using any convenient technique.

A minor variation upon the steps described above are presented in Table 3 below, using substitute steps 32W and 320″, which replace step 320.

TABLE 3

| | |
|---|---|
| Step 320′ | The editor intelligently tries to determine the actual natural language of the constructs that need to be translated. This can be achieved by asking the translation engine to perform this task. |
| Step 320″ | The regional settings of the operating system can be used to determine the default natural language into which the code constructs are to be translated. |

Translation of Parsed Function and Variable Names

Feeding a function name such as sort_array( ) or SortArray( ) may not yield a correct translation. Naming a function depends on the coding style of the program. Therefore, the tokenizing and parsing provided by existing editors may not suffice to break a function name into meaningful words. In this case, the editor can provide an interface in which a programmer can tell the editor the coding convention being used.

Alternatively, the editor can attempt detecting the coding convention by keeping a repository of various coding styles in a language understood internally by the debugger. For example an input such as "(W_)*W" may denote that a function/variable name consists of English words followed by an underscore, optionally followed by a word and another underscore multiple times, and finally ending with a English language word. As stated earlier, the editor itself can hold such expressions in a repository for intelligent detection of words in a variable or function name, or any other token that the programmer finds fit for translation.

Figure 4:
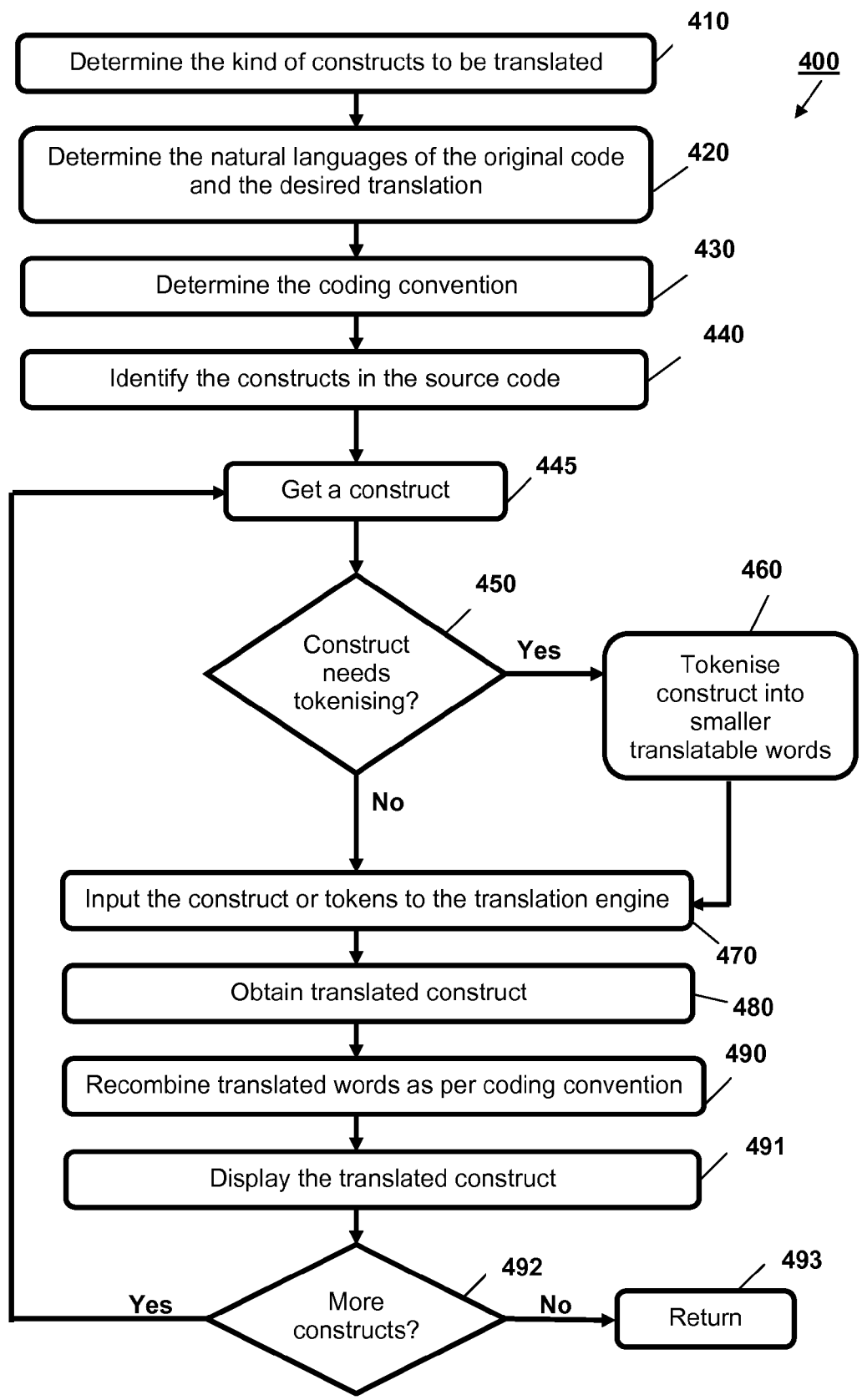
FIG. 4 is a flow chart that represents steps for translating parsed function and variable names.

FIG. 4 is a flow chart that summarizes the steps for translating parsed function and variable names. The steps of FIG. 4 are tabulated in Table 4 below using correspondingly numbered steps.

TABLE 4

| | |
|---|---|
| Step 410 | The editor gathers the kind of constructs that need to be translated as input from the user. Optionally, this information is obtained from user settings (or from default settings, if no user settings are specified). |
| Step 420 | The editor gathers the source and destination natural languages for the translation process as input from the user. |
| Step 430 | The editor determines from the user the coding convention of the constructs that require translation. This means that the user is supposed to determine how the constructs are to be further tokenized by supplying the delimiters that separate the tokens in a construct. Alternatively, editor determines the coding convention intelligently by comparing the source code against a repository of standard coding conventions. For example, a variable named "InputName" may be matched against all the coding conventions that the editor knows about. The editor may find a coding convention (W)*W in its repository, which indicates that a variable name may have one or more words concatenated together. (Words are identified by the change in the case of the letter as in "InputName"). On checking the words "Input" and "Name" in a standard dictionary (in the natural language of the original code), the editor may find that both the words are valid. This test may be enough to intelligently guess the coding convention of the source code constructs. A detailed explanation of this step is described later. |
| Step 440 | The editor identifies the constructs in the program being edited. This is done with the help of lexical analysis and parsing, which is either incorporated into the editor, or facilitated by external tools. |
| Step 445, 450 | The editor gets a construct to be translated and determines if the construct needs further tokenizing against the current determined coding convention. If so, perform step 460 else perform step 470. |

TABLE 4-continued

| | |
|---|---|
| Step 460 | Tokenize the construct further into smaller translatable words. Neglect the non-natural language tokens that act as prefixes, suffixes, etc. For example, the function name GInputData( ) is tokenized as G, Input and Data based on the coding convention GW*W that denotes a function name is one or more words concatenated together and the name always begins with the alphabet G. The relevant tokens of this example are Input and Data. G can be ignored as G acts as a prefix, and need not be translated. |
| Step 470 | The editor feeds the constructs or the tokenized constructs of step 460 (if any) as input to the translation engine. |
| Step 480 | The editor obtains the output (translated constructs) from the translation engine. |
| Step 490 | If there were any smaller tokenized words in step 460 then combine the translated output, as per the coding conventions. This includes re-inserting the prefixes, suffixes and other non-natural language constructs that were neglected in step 460. Effectively, this is the inverse of step 460. |
| Step 491 | The editor displays the translated constructs in a comprehensible manner. A few sample techniques are as follows:<br>1. Layer the translated code on top of the original code and display the translated code.<br>2. Insert the translated code as comments in the original code.<br>3. Display the translation as a tool tip when the mouse hovers over a construct that needed translation.<br>4. Display the translation in a separate window along with the original code in another window.<br>5. Display the translation in any other convenient manner. |
| Step 492 | If there are more constructs to be translated then perform step 450 else perform step 493. |
| Step 493 | Return to the calling function. |

Figure 5:
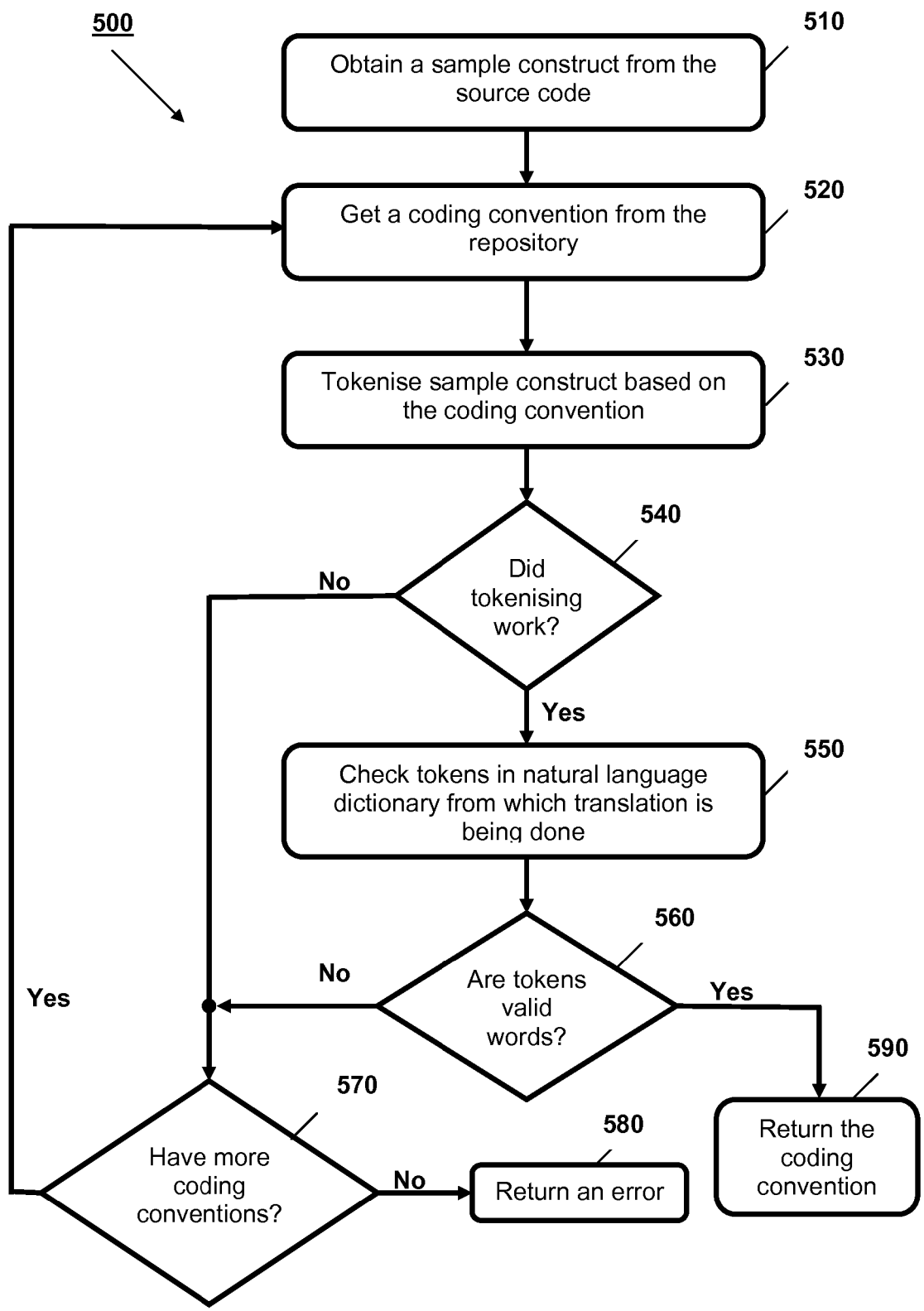
FIG. 5 is a flow chart that represents steps for intelligently determining a coding convention.

FIG. 5 is a flow chart that outlines how a coding convention may be determined intelligently. These steps in FIG. 5 are tabulated in Table 5 below using correspondingly numbered steps.

TABLE 5

| | |
|---|---|
| Step 510 | Obtain a sample construct from the source code. A sample construct can be chosen at random. |
| Step 520 | Retrieve a coding convention from the repository. |
| Step 530 | Tokenize the sample construct based on the coding convention. |
| Step 540 | If tokenizing resulted in tokens then perform step 550 else perform step 570. |
| Step 550 | Check if lexemes (corresponding to the tokens) are present in the dictionary. The tokens that are checked are constructs that can be translated. That is, suffixes, prefixes, etc are not checked. The language of the dictionary is the source language from which the translation is being performed. |
| Step 560 | If the lookup of step 550 was successful, then proceed to step 590 else perform step 570. |
| Step 570 | If there is more coding conventions in the repository then processing resumes at step 520 else proceed to step 580. |
| Step 580 | Return an error to the editor. |
| Step 590 | Return the coding convention. |

Displaying Translated Function and Variable Names

Debugging assists in detecting bugs in a program during runtime. A commonly used technique is called interactive debugging, which involves inserting breakpoints and observing the state of a program when a breakpoint is hit. A state of a program at an instance includes the call stack, variables, memory, registers, etc. A compiler generates binary executables from source code. The binaries that are meant to run on customer's sites do not have additional information that facilitates the querying of a program's state during runtime. Using such binaries can be tedious without this information to debug them. To provide support for debugging, a special directive (usually a switch) instructs compilers to generate additional information. This information aids in displaying variable names, function names, source code mapping, etc in a form that the programmer readily comprehends. This extra information is called the debug information, or debug symbols. These symbols help the debugger provide the following listed items of information:
1. Call Stack
2. Machine code to source code mapping
3. Variables
4. Stack frame information (in case frame pointer is omitted for optimization).

The debug information is either combined with the object files, or is stored separately in a different file. COFF and PDB are two formats for debug information.

Code is desirably viewed in a language that one understands, but the translated text may not exactly match with the original text when one is debugging the variables displayed by the debugger. The debugger also interfaces with the translation engine (or uses cached results) and translate the function/variable names, and other tokens so that the programmer's view of the variable names, function names, etc is the same as that displayed in the translated view of the code.

The technique described above in the subsection entitled "Translation of parsed function and variable names", together with cached translations, can be used in the debugger. This solution can be further extended to tools that dump the debug information in various formats. For example, the tool objdump, may dump translated versions of the debug information so that this information makes more sense to the programmer.

If variable names in an editor are translated into another language, then similar techniques when applied to the debug information allow programmers to view translated variable names in tools that make use of this information. For example, if the editor translates the variable "InputName" in source code, then viewing this variable in the debugger should show the translated name to the users of the debugger. This enhances the debugger to let users observe the state of the program using translated debug symbols.

If the translation engine translates code from the editor, the results can be cached and subsequently used by the debugger to display variable and function names in their translated form. More generally, any tool that makes use of the debug symbols can translate the symbols to allow the users to view translated names of these symbols in the desired natural language.

Figure 6:
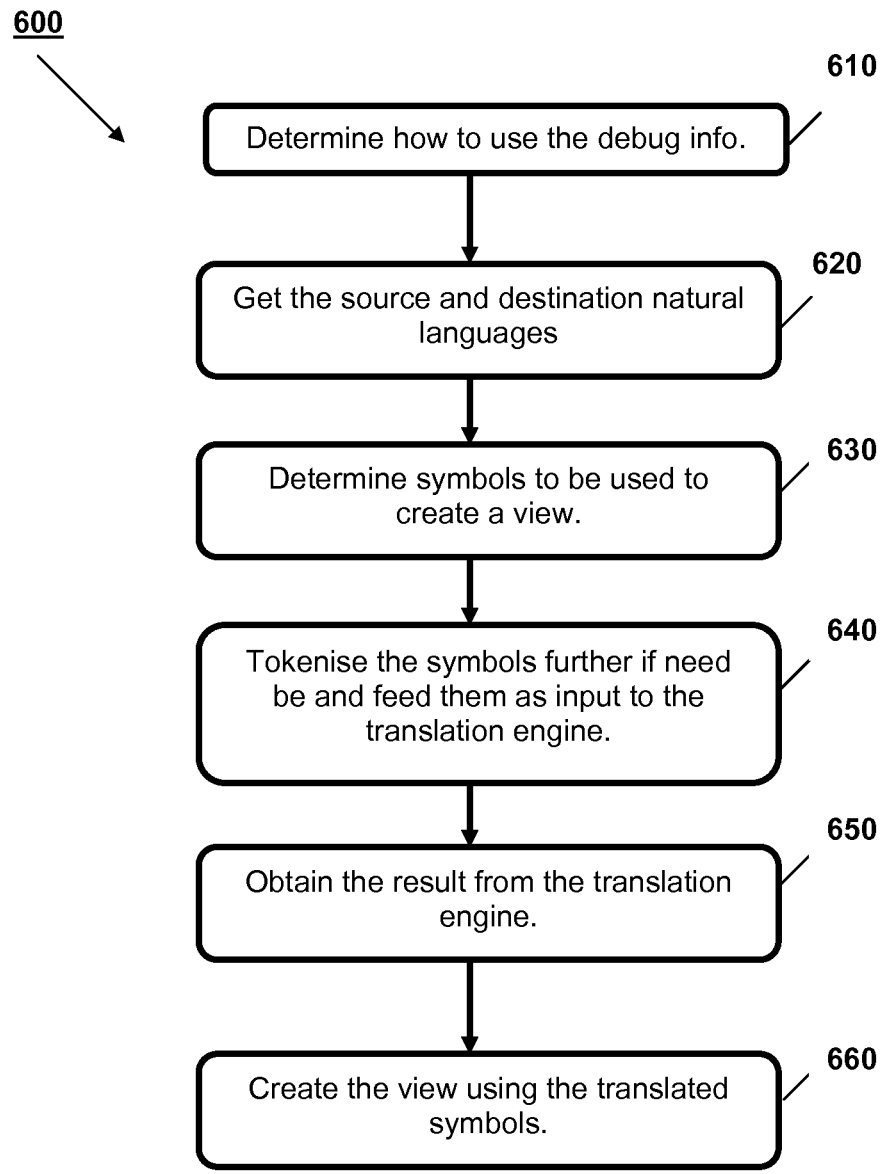
FIG. 6 is a flow chart that represents steps required to translate debug symbols.

FIG. 6 is a flow chart of the steps required to translate debug symbols. The same are outlined below in Table 6 using correspondingly numbered steps.

TABLE 6

| | |
|---|---|
| Step 610 | The debugger determines how to use the debug information to display the state of a program in a manner that is useful to the programmer. Some examples of this are displaying function names in a call stack, displaying variable names and their values, etc. |
| Step 620 | The debugger determines the source natural language of the debug symbols and the natural language into which translation is to be performed. |
| Step 630 | The debugger determines the symbols that the debugger needs in its display. |
| Step 640 | The debugger feeds these symbols as inputs to the translation engine. The inputs are further tokenized if need be as explained in the subsection entitled "Translation of parsed function and variable names". |
| Step 650 | The debugger obtains the results from the translation engine. |
| Step 660 | The debugger uses the translated text to display the debug symbols. |

Figure 7:
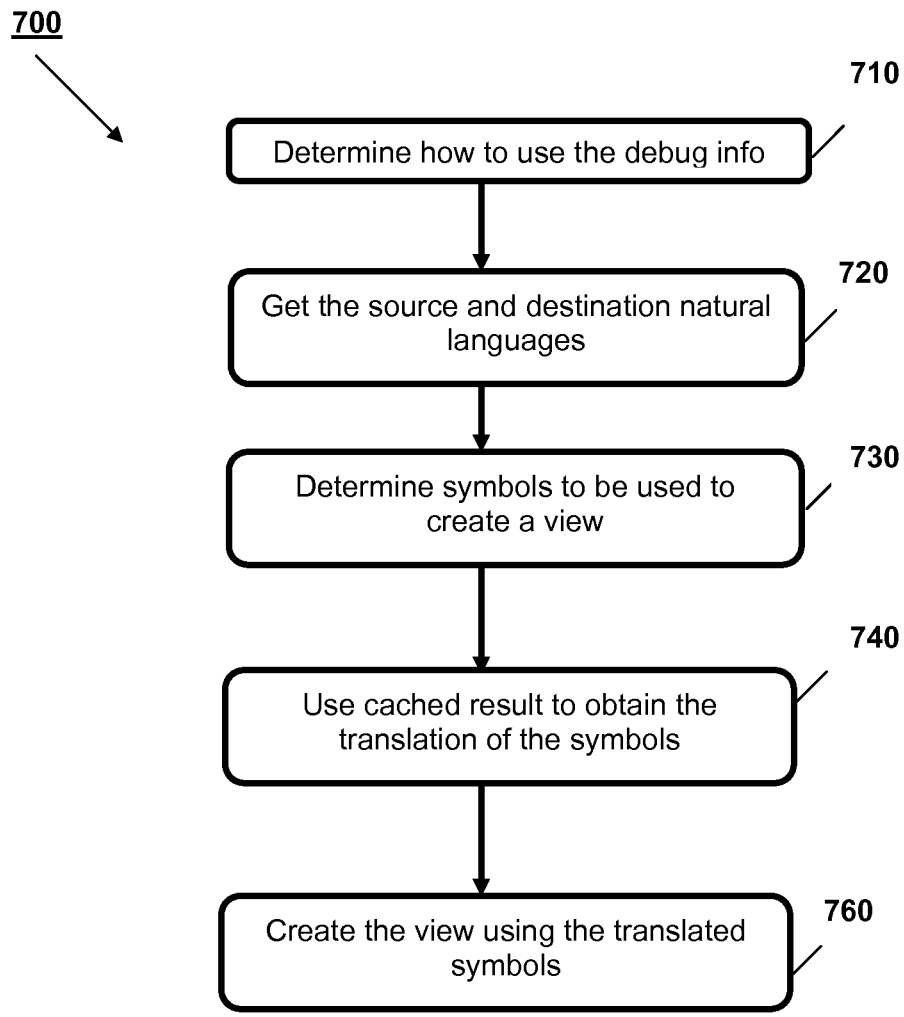
FIG. 7 is a flow chart that represents steps required to translate the debug symbols using cached results.

FIG. 7 is a flow chart of the steps required to translate the debug symbols using cached results. An alteration to the steps of FIG. 6 is presented in Table 7 below.

TABLE 7

| | |
|---|---|
| Step 740 | To make use of caching, steps 640, 650 of FIG. 6 can be replaced with this step 740 represented in FIG. 7. The debugger obtains the cached translation results that were generated while translating variable and function names in the editors. |

Working with Translated Names

Debuggers and related tools often allow programmers to input the variable names for display, manipulation, etc. These names are matched in the symbol table and the debugging information stored during compile time. If no match is found for the input provided, the debugger flags an error. The debugger in this case allows the programmer to input these names in the translated string. The name is not only searched in the symbol table/debug information but also in the list of variables that were translated and used in the debugger.

Figure 8:
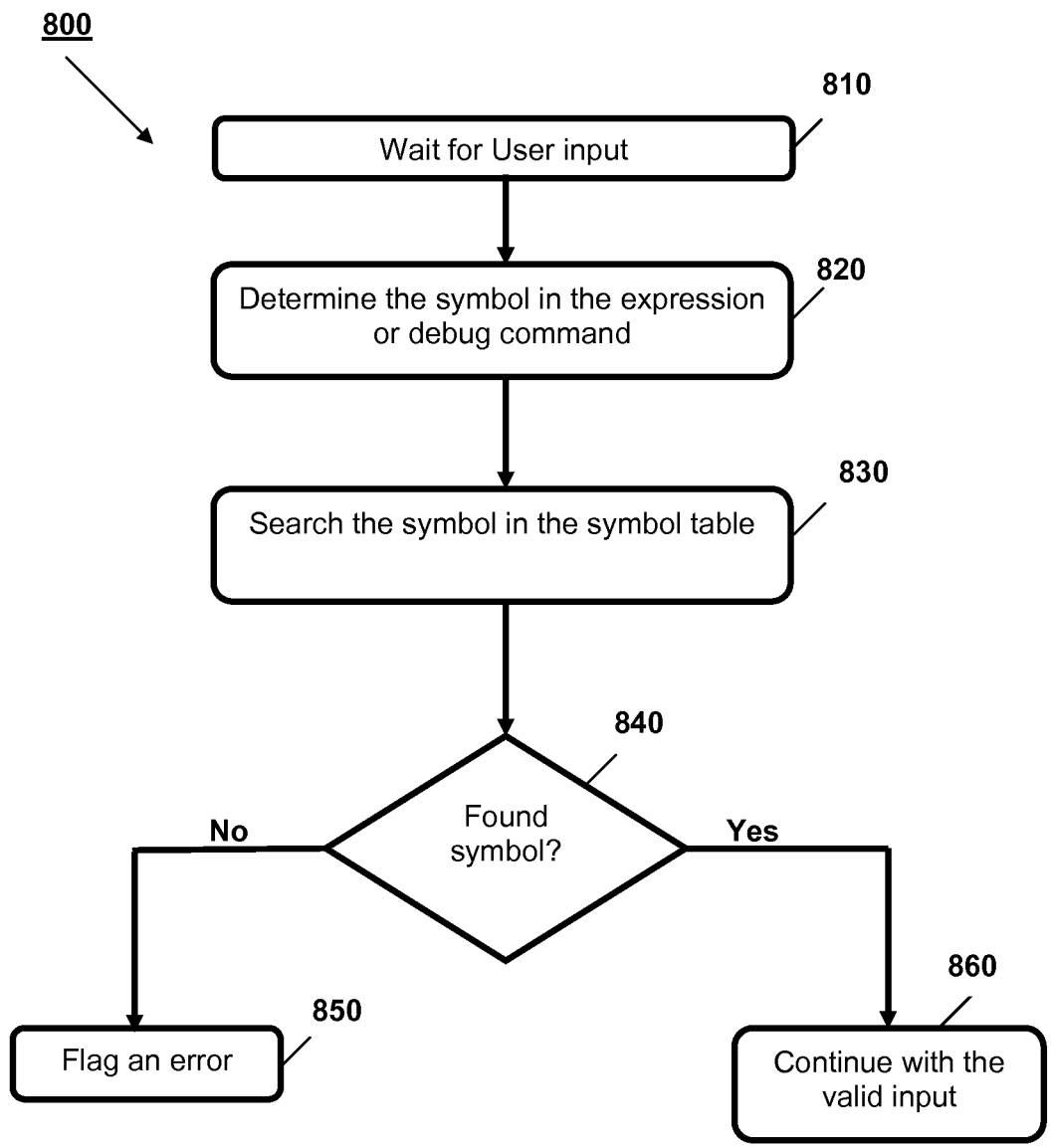
FIG. 8 is a flow chart that represents steps for using symbols in debuggers.

Debuggers let programmers input symbol names in expressions in a watch window, a command line, etc. The debugger flags an error if the symbol is not found in the debug information. FIG. 8 is a flowchart that describes how symbols are conventionally used in debuggers. These steps are outlined in Table 8 using correspondingly numbered steps.

TABLE 8

| | |
|---|---|
| Step 810 | Wait for user input. |
| Step 820 | Determine the symbols in the expression or debug command. |
| Step 830 | Search the symbol in the debug symbol table. |
| Step 840 | If found, then perform step 860, else perform step 850 |
| Step 850 | Return an error "Symbol not found" to the user. |
| Step 860 | Continue the debugging task. |

Figure 9:
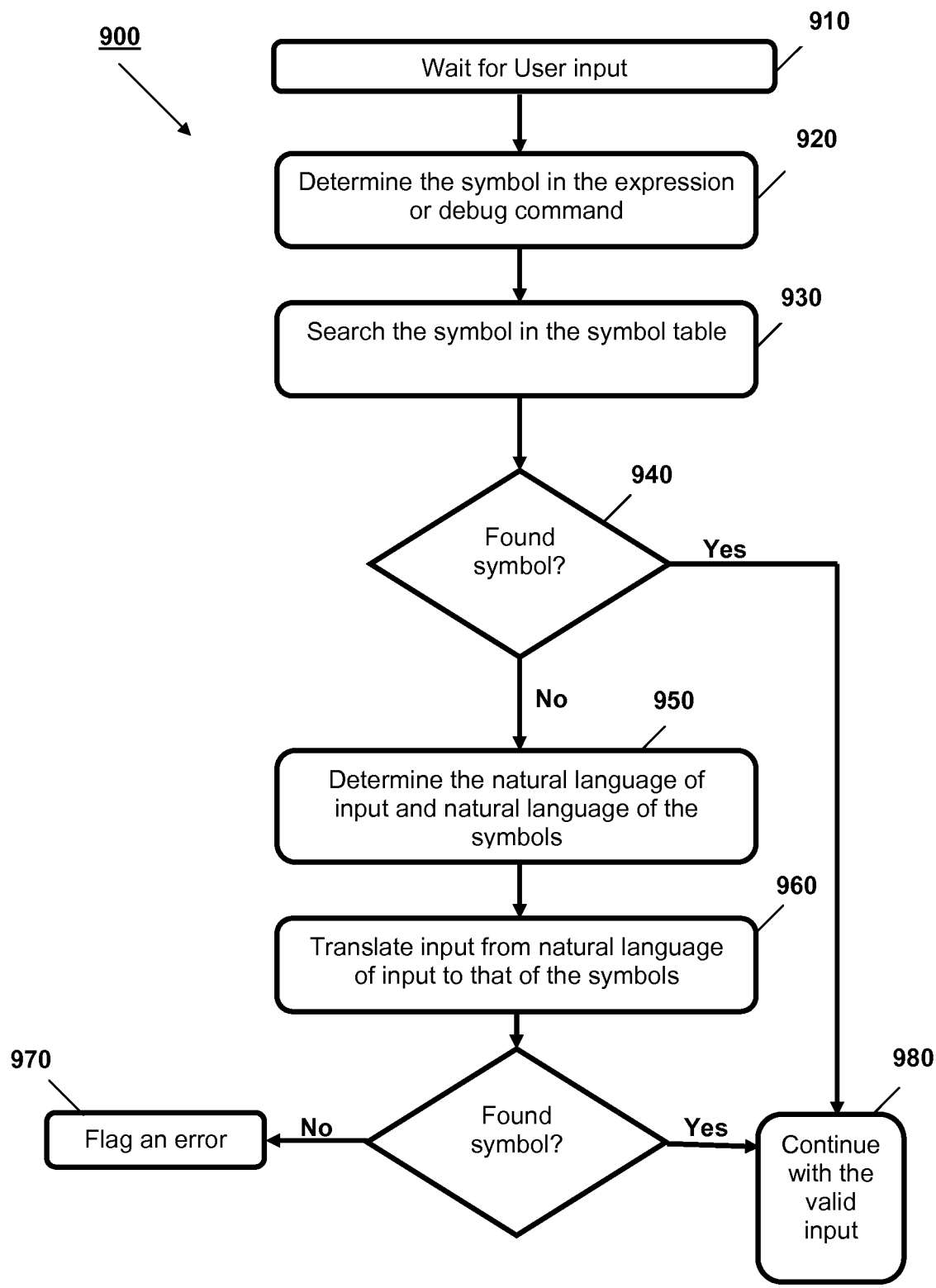
FIG. 9 is a flow chart that represents steps required for a debug session to accept translated names.

Translated names can even be used in the above scenario. FIG. 9 is a flowchart that describes steps required for a debug session to accept translated names. These steps are outlined in the Table 9 using correspondingly numbered steps.

TABLE 9

| | |
|---|---|
| Step 910 | Wait for user input. |
| Step 920 | Determine the symbols in the expression or debug command. |
| Step 930 | Search the symbol in the debug symbol table. |
| Step 940 | If found, then perform step 990, else perform step 950 |
| Step 950 | Determine the natural language of input and that of the symbols. |
| Step 960 | Translate the input into natural language of the symbols. If need be, re-tokenize the input as described in the subsection "Translation of parsed function and variable names". |
| Step 970 | If translated input (result of 960) is found in the symbol table then perform step 990, else perform step 980. |
| Step 980 | Return an error "Symbol not found" to the user. |
| Step 990 | Continue the debugging task. |

Figure 10:
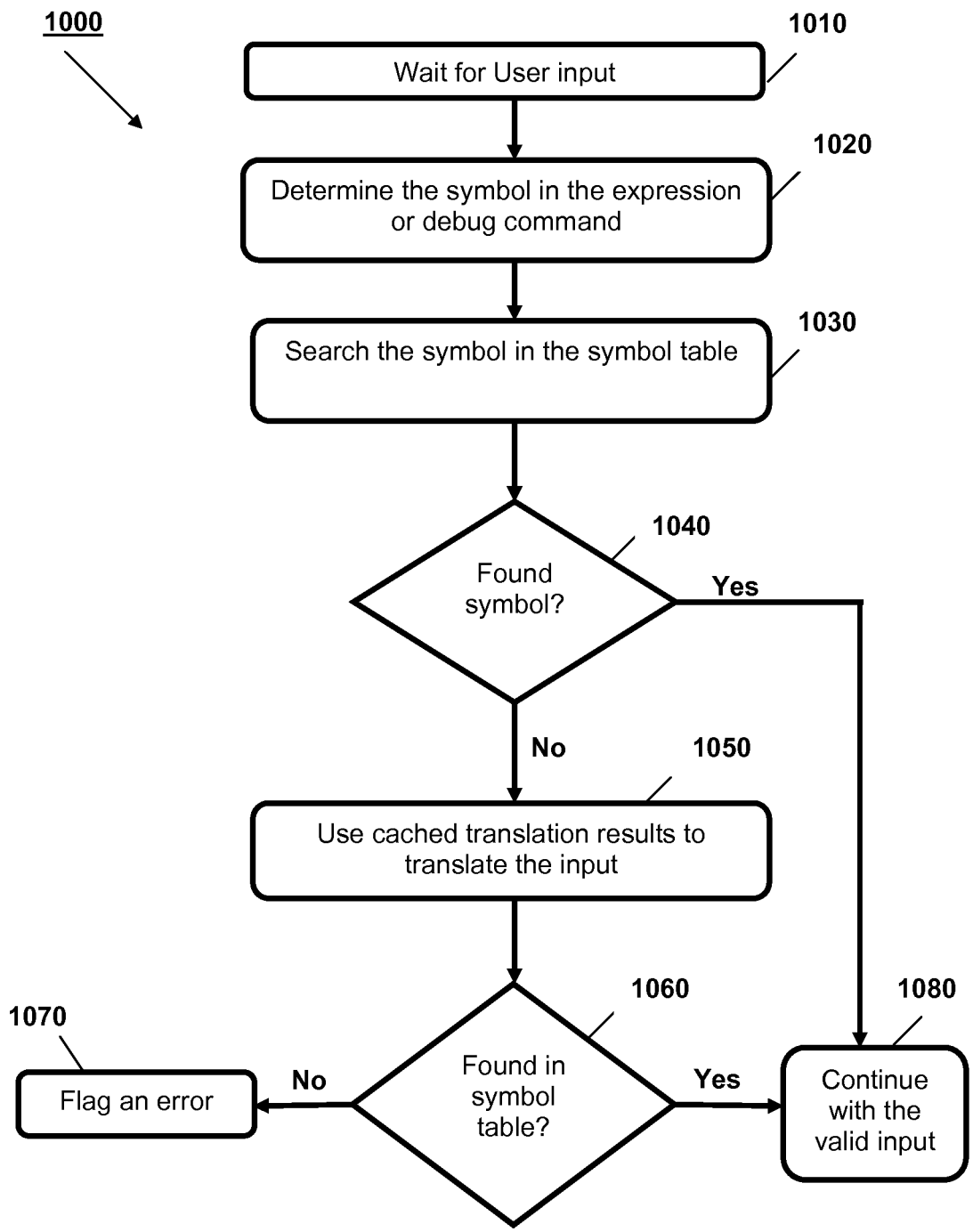
FIG. 10 is a flow chart that represents steps for allowing programmers to enter names in their native tongue in a debugging tool using cached results.

FIG. 10 is a flow chart that describes how a debugging tool can use cached results to allow programmers to enter names in their native tongue. A variation upon the steps of FIG. 9 and Table 9 above is described below in Table 10.

TABLE 10

| | |
|---|---|
| Step 1050 | To make use of caching, steps 950, 960 can be replaced with this step. Reuse previously cached results to translate the input. |

Configurability to Programmers' Needs

Various combinations the facilities described above may be used. Therefore, the tools also provide a user configurability to cater to the needs of all programmers. For example, the editor may be configured to overwrite (in display only) the comment with the translated version. Optionally, the translated version can be displayed in the status bar or other graphical user interface (GUI) controls. Similarly, the user may have the option of translating function names but not variable names. The programmer may additionally have user interface controls that let her or him translate comments in a highlighted area. Many options are possible. The above solution can further be extended to other tools such as design tools, other debugging utilities, etc.

Integrated Development Environments

Integrated Development Environments (IDEs) are user interfaces that combine various programming tools together in a single computer "environment". IDEs provide an interface to various development tools such as debuggers and compilers. IDEs also have editors, so that the edit-compile-debug cycle can be performed from the same program. Microsoft Visual Studio is an example of such an IDE. An integrated environment improves the productivity of programmers. Creating an IDE requires creating a graphical user interface (GUI) to the various tools.

Editors, debuggers, and other debugging tools can use a translation module to facilitate understanding of certain portions of a computer program in the desired natural language as described herein. An IDE can be used in a similar manner, and consequently uses tools that support the translation. As an example, an IDE can be constructed having 1. An editor that is capable of interfacing with translation modules to translate comments, variable names and functions names, as described herein.
2. A debugger that is capable of providing translated symbol names to the IDE for display. Also, the debugger allows input of symbol names in the desired natural language, so that the user may input symbol names similar to what is displayed in the GUI and the computer code.

A special debugger that can translate can also be used. IDEs are graphical user interface (GUI) "front-ends" that display what the debugger is instructed to perform. Similarly, user input is passed to the debugger via the IDE. That is, the task of displaying and providing user edit controls is left to the IDE. Therefore, for debuggers that do not translate symbols, the IDE can perform the extra step of translating symbols on the fly when the IDE is displaying the translated symbols. That is, when the debugger provides the symbols and the values for display, the IDE translates the symbols and then displays the translated symbols in its GUI. Also, when the user inputs something, for example changes the value of a variable, the user can do so by making changes to what is apparently a translated version of the variable name. The IDE can then map the translated variable name to its actual symbol and pass the symbol to the debugger.

A common translation engine may be deployed, and the task of translation can be thus centralized between all tools used by an IDE. The common translation engine fulfills the translations needs of the editor and the debugger. Centralizing translation allows translation to result to be cached to avoid unnecessary retranslation.

An IDE can thus be constructed by using editors and debuggers with translation capabilities. Optionally, the IDE may perform translation, tokenizing and re-tokenizing (as required) centrally for all tools.

Computer Hardware and Software

Figure 11:
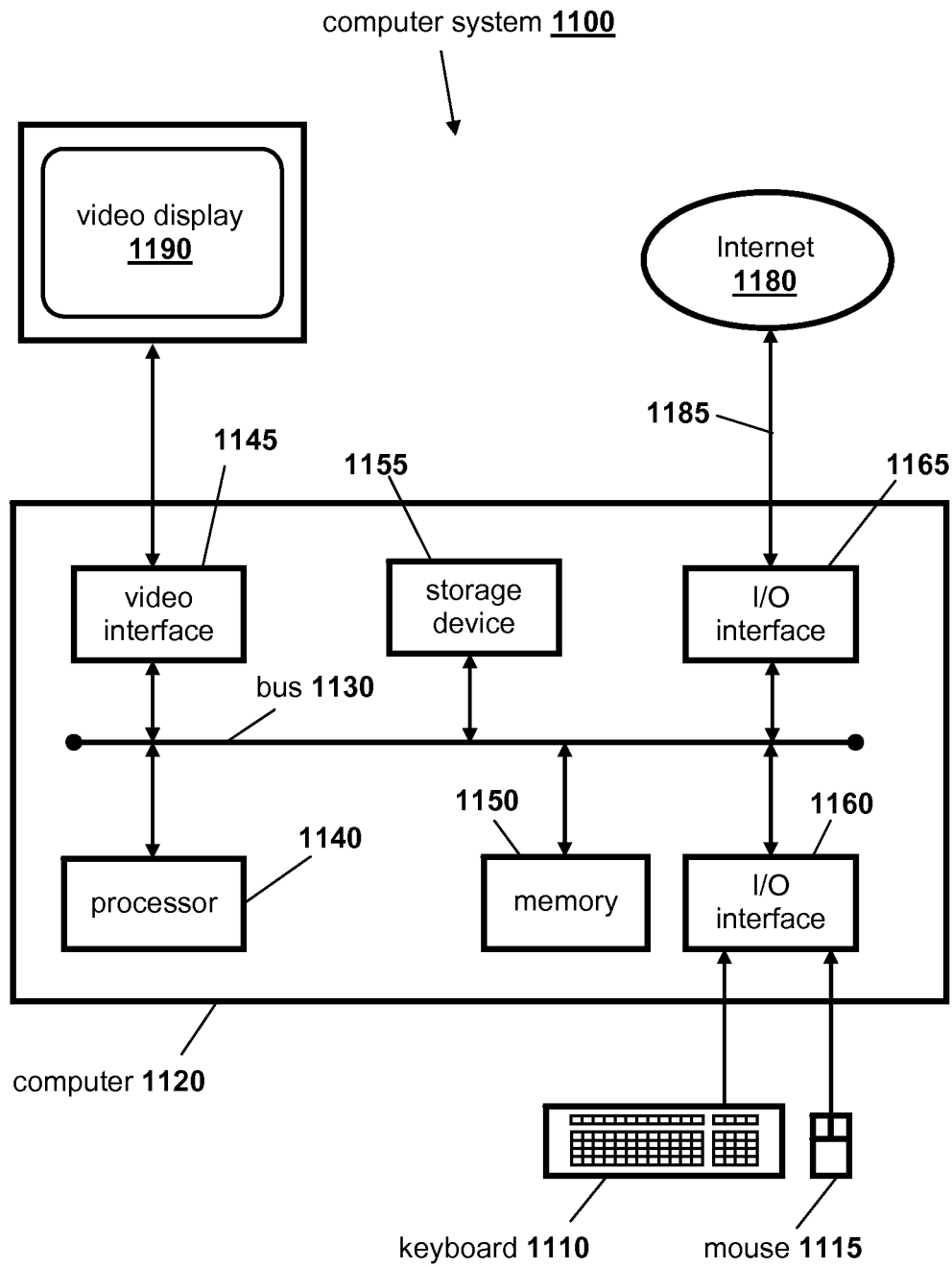
FIG. 11 is a schematic representation of a computer system suitable for performing the techniques described herein.

FIG. 11 is a schematic representation of a computer system 1100 that executes a debugger as described herein. The debugger software executes under a suitable operating system installed on the computer system 1100 to assist in performing the described techniques. The debugger software is programmed using any suitable computer programming language.

The components of the computer system 1100 include a computer 1120, a keyboard 1110 and mouse 1115, and a video display 1190. The computer 1120 includes a processor 1140, a memory 1150, input/output (I/O) interfaces 1160, 1165, a video interface 1145, and a storage device 1155.

The processor 1140 is a central processing unit (CPU) that executes the operating system and the computer software executing under the operating system. The memory 1150 includes random access memory (RAM) and read-only memory (ROM), and is used under direction of the processor 1140.

The video interface 1145 is connected to video display 1190 and provides video signals for display on the video display 1190. User input to operate the computer 1120 is provided from the keyboard 1110 and mouse 1115. The storage device 1155 can include a disk drive or any other suitable storage medium.

Each of the components of the computer 1120 is connected to an internal bus 1130 that includes data, address, and control buses, to allow components of the computer 1120 to communicate with each other via the bus 1130.

The computer system 1100 can be connected to one or more other similar computers via a input/output (I/O) interface 1165 using a communication channel 1185 to a network, represented as the Internet 1180.

The debugger software may be recorded on a portable storage medium, in which case, the computer software program is accessed by the computer system 1100 from the storage device 1155. Alternatively, the debugger software can be accessed directly from the Internet 1180 by the computer 1120. In either case, a user can interact with the computer system 1100 using the keyboard 1110 and mouse 1115 to operate the programmed computer software executing on the computer 1120.

Other configurations or types of computer systems can be equally well used to implement the described techniques. The computer system 1100 described above is described only as an example of a particular type of system suitable for implementing the described techniques.

CONCLUSION

The debugger described herein allows for development of computer software code in various geographical locations by reducing language-related problems. Programmers can achieve a better understanding of legacy computer software code written that relies upon expressions in a natural language with which the programmer is not familiar. That is, a programmer interpreting another programmer's code can debug computer software in an environment that caters to their own language needs. Conversely, a programmer developing source code can rely upon their native language to freely expression ideas within the computer code.

The problem of poor translation accuracy decreases as translation engines become ever more sophisticated. Thus, the benefits of permitting a programmer to use their native language are available with only little disadvantage.

Various alterations and modifications can be made to the techniques and arrangements described herein, as would be apparent to one skilled in the relevant art.

We claim:

1. A computer program product for selectively translating predetermined portions of a computer program from a source natural language to a target natural language, the computer program product including a non-transitory computer readable storage medium having instructions stored thereon for execution by a computer, wherein the instructions, when executed by the computer, cause the computer to implement a method comprising:

identifying predetermined, selected textual constructs of a computer program, wherein the identifying of the predetermined textual constructs includes identifying by a central processor of the computer system, the constructs including words in a source natural language, wherein the words of the construct are to be translated to a target natural language and wherein the words of the construct to be translated are delimited in the source code according to a stored coding convention, wherein the stored coding convention represents a pattern in which semantic content is expressed in the predetermined textual constructs; and if the construct is a function or a variable name:

identifying words of a function or a variable name according to the coding convention, wherein the identifying of the words includes identifying by a central processor of the computer system;

translating the identified words of the function or variable name, from the source natural language to the target natural language; and assembling the words as translated into the target natural language according to the coding convention;

if the construct is a comment, translating the words of the comment construct; and displaying the source code translated variable name or comment in the target natural language.

2. The computer program product as claimed in claim 1, wherein the method implemented by the computer executing the instructions of the computer program product further comprises operating the computer system to obtain the coding convention from a user.

3. The computer program product as claimed in claim 1, wherein the method implemented by the computer executing the instructions of the computer program product further comprises operating the computer system to detect the coding convention by matching the function name or variable name against coding conventions stored in a repository.

4. The computer program product as claimed in claim 1, wherein the coding convention is selected from the set including (1) zero or more words followed by a word, (2) zero or more words followed by a delimiter followed by a word, and (3) combinations of elements (1) and (2) with non-natural language prefixes and suffixes.

5. The computer program product as claimed in claim 1, wherein the source code function names, variable names and comments of the computer program are identified from textual input supplied by a programmer.

6. The computer program product as claimed in claim 1, wherein the method implemented by the computer executing the instructions of the computer program product further comprises displaying the translated source code function names, variable names and comments in part of a graphical user interface.

7. The computer program product as claimed in claim 1, wherein the method implemented by the computer executing the instructions of the computer program product further comprises operating the computer system to assemble the translated words according to the coding convention prior to displaying the translated source code function names and variable names.

8. A computer system comprising:
a processor; and
a storage device connected to the processor, wherein the storage device has stored thereon a program for selectively translating predetermined portions of a computer program from a source natural language to a target natural language for controlling the processor, and wherein the processor is operative to execute instructions of the program to implement a method comprising:
identifying predetermined, selected textual constructs of a computer program, wherein the identifying of the predetermined textual constructs includes identifying by a central processor of the computer system, the constructs including words in a source natural language, wherein the words of the construct are to be translated to a target natural language and wherein the words of the construct to be translated are delimited in the source code according to a stored coding convention, wherein the stored coding convention represents a pattern in which semantic content is expressed in the predetermined textual constructs; and
if the construct is a function or a variable name:
identifying words of a function or a variable name according to the coding convention, wherein the identifying of the words includes identifying by a central processor of the computer system;
translating the identified words of the function or variable name, from the source natural language to the target natural language; and
assembling the words as translated into the target natural language according to the coding convention;
if the construct is a comment, translating the words of the comment construct; and
displaying the source code translated variable name or comment in the target natural language.

9. The computer system as claimed in claim 8, wherein the processor is operative to execute instructions of the program to obtain the coding convention from a user.

10. The computer system as claimed in claim 8, wherein the processor is operative to execute instructions of the program to detect the coding convention by matching the function name or variable name against coding conventions stored in a repository.

11. The computer system as claimed in claim 8, wherein the coding convention is selected from the set including (1) zero or more words followed by a word, (2) zero or more words followed by a delimiter followed by a word, and (3) combinations of elements (1) and (2) with non-natural language prefixes and suffixes.

12. The computer system as claimed in claim 8, wherein the source code function names, variable names and comments of the computer program are identified from textual input supplied by a programmer.

13. The computer system as claimed in claim 8, wherein the processor is operative to execute instructions of the program to display the translated source code function names, variable names and comments in part of a graphical user interface.

14. The computer system as claimed in claim 8, wherein the processor is operative to execute instructions of the program to assemble the translated words according to the coding convention prior to displaying the translated source code function names and variable names.

* * * * *